(12) United States Patent
Shin et al.

(10) Patent No.: US 11,443,304 B2
(45) Date of Patent: Sep. 13, 2022

(54) METHOD AND APPARATUS FOR IDENTIFYING WALLETS ASSOCIATED WITH VIRTUAL ASSET SERVICE PROVIDERS

(71) Applicants: KOREA INTERNET & SECURITY AGENCY, Naju-si (KR); Lambda256, CO., LTD, Seoul (KR)

(72) Inventors: Yong Hee Shin, Naju-si (KR); Moon Hee Cho, Naju-si (KR); Kyeong Han Kim, Naju-si (KR); Dae Il Jang, Naju-si (KR); Seung Goo Ji, Naju-si (KR); Jae Hoon Oh, Seongnam-si (KR)

(73) Assignees: KOREA INTERNET & SECURITY AGENCY, Naju-si (KR); Lambda256. CO., LTD, Seoul (KR)

( * ) Notice: Subject to any disclaimer, the term of this patent is extended or adjusted under 35 U.S.C. 154(b) by 0 days.

(21) Appl. No.: 17/503,135

(22) Filed: Oct. 15, 2021

(65) Prior Publication Data
US 2022/0198443 A1 Jun. 23, 2022

(30) Foreign Application Priority Data
Dec. 22, 2020 (KR) .......... 10-2020-0180844

(51) Int. Cl.
*G06Q 20/00* (2012.01)
*G06Q 20/36* (2012.01)

(52) U.S. Cl.
CPC ..... *G06Q 20/3678* (2013.01); *G06Q 2220/00* (2013.01)

(58) Field of Classification Search
CPC .............. G06Q 20/3678; G06Q 2220/00
USPC ................. 705/16, 21; 380/44, 262
See application file for complete search history.

(56) References Cited

FOREIGN PATENT DOCUMENTS

| KR | 10-2027728 B1 | 10/2019 |
|---|---|---|
| KR | 10-2019-0135360 A | 12/2019 |
| KR | 10-2110266 B1 | 5/2020 |
| KR | 10-2113347 B1 | 5/2020 |
| WO | WO-2019142968 A1 * | 7/2019 |

OTHER PUBLICATIONS

Foreign Ref Included (Year: 2019).*
ITP "Weekly ICT Trends" No. 1952; Jun. 24, 2020; pp. 1-40.
Lambda256 Inc "How can I identify the exchange wallet address?" retrieved Dec. 30, 2020; pp. 1-6; https://luniverse.io/dusting_technique/.

* cited by examiner

*Primary Examiner* — Dante Ravetti
(74) *Attorney, Agent, or Firm* — Studebaker & Brackett PC

(57) ABSTRACT

A method for identifying a wallet address associated with a virtual asset service provider is provided. The method comprises receiving a target wallet address, obtaining a transaction of a virtual asset associated with the target wallet address, obtaining a list of a plurality of known wallet addresses of virtual asset service providers (VASPs) and identifying a type of the target wallet address, by performing at least one of a cold wallet determination routine and a hot wallet determination routine for the target wallet address, based on the transaction and the list of known wallet addresses of the VASPs.

8 Claims, 11 Drawing Sheets

| ID | INPUT ADDRESS | OUTPUT ADDRESS | TRANSACTION ASSET VALUE | TIME | ... |
|---|---|---|---|---|---|
| 1 | 36718cp5ktBy... | 3P7Dbq93T8... 13BkpMKWUW... | 0.00014093 BTC | 1608012178 | ... |
| 2 | 399LhavcqSvq... 13BkpMKWUWQ... | 1igV5Xev5f... | 6.61782071 BTC | 1608012345 | ... |
| 3 | ... | ... | ... | ... | ... |
| 4 | ... | ... | ... | ... | ... |

11

| ID | SENDER ADDRESS | RECEIVER ADDRESS | TRANSACTION ASSET VALUE | TIME | ... |
|---|---|---|---|---|---|
| 1 | 56fd33b37b28... | 1c5b662a08d40... | 0.611428114562323488 ETH | 1608012178 | ... |
| 2 | Da8646d996058 | Eaee3a142ac4e0.... | 0.163818897637795252 ETH | 1608012345 | ... |
| 3 | ... | ... | ... | ... | ... |
| 4 | ... | ... | ... | ... | ... |

| ID | WALLET ADDRESS | VIRTUAL ASSET TYPE | ASSOCIATED VASP | WALLET TYPE | INFORMATION SOURCE | RELATED FRAUDULENT TRANSACTION TYPE |
|---|---|---|---|---|---|---|
| 1 | 56fd33b37b28... | ETH | VASP #48 | HOT WALLET | ... | ... |
| 2 | Eaee3a142ac4e0... | ETH | VASP #48 | COLD WALLET | ... | ... |
| 3 | 399LhavcSvqRA8i... | BTC | VASP #2 | PERSONAL WALLET | ... | ... |
| 4 | ... | ... | ... | ... | ... | ... |

FIG. 5

METHOD AND APPARATUS FOR IDENTIFYING WALLETS ASSOCIATED WITH VIRTUAL ASSET SERVICE PROVIDERS

This application claims the benefit of Korean Patent Application No. 10-2020-0180844, filed on Dec. 22, 2020, in the Korean Intellectual Property Office, the disclosure of which is incorporated herein by reference in its entirety.

BACKGROUND

1. Field

The present disclosure relates to a method and apparatus for identifying a wallet address of a virtual asset service provider or a virtual asset exchange. More specifically, the present disclosure relates to a method and apparatus for identifying a virtual asset service provider associated with any virtual asset wallet address, and identifying a type of a wallet associated with the virtual asset service provider.

2. Description of the Related Art

The dark web refers to the web part of the dark net, which is an overlay network that can be accessed only with specific software or network permissions or settings that use non-standard communication protocols and ports. Dark web user's ID and location are kept anonymous, they are difficult to track due to layered encryption system, and dark web encryption technology routes user's data through multiple intermediate servers to protect user's identity and ensure anonymity. The information transmitted from the dark web can be decrypted only by the subsequent node of the scheme, which leads to the end node. Due to the complex system of the dark web, it is difficult to reproduce the node path and decode the information layer by layer. Further, due to the high level of encryption, it is difficult for a web host on the dark web to track the user's geographic location and IP, and on the contrary, it is difficult for the user to obtain information about the host.

Virtual assets are digital assets created using cryptographic technology, and virtual assets are used in the form of encrypted data in a network-connected Internet space. Most virtual assets store and transmit value using decentralized blockchain technology, and use an encryption technology called hash to ensure the reliability and safety of transactions without a central bank that guarantees value.

Recently, cybercrimes such as the concealment and laundry of criminal funds using the dark web and virtual assets, etc. are increasing rapidly, and the level of crime is increasing. Further, existing crimes such as distribution of drugs and pornography and concealment of criminal funds are developing into cybercrimes using the dark web and virtual assets. For example, the number of global users reached 2.9 million in 2019. Further, as of 2017, cybercrime-related sites accounted for more than half of the total dark web. In addition, as virtual assets that are difficult to track are used for cybercrimes, economic and social damages are increasing rapidly. In 2019, the global virtual asset crime loss amounted to 45.2 billion, which is 1.6 times higher than the previous year, and the amount of virtual asset transaction on the dark web in 2019 reached 12.5 million, which is 1.5 times higher than the previous year.

As cybercrimes using the dark web and virtual assets are exploding and the level of crime is gradually increasing, there is an evaluation that the technology to track them is still at a weak level. Both the dark web and virtual assets provide strong anonymity, so analyzing and tracking crimes using them is a difficult technical task. In particular, since crimes through the dark web and virtual assets are closely related to real life, technologies for analyzing and tracking cybercrimes using the dark web and virtual assets are strongly required.

In particular, identification of virtual asset service provider (VASP) by transaction stage for tracking virtual assets used in crime, collection and identification of virtual asset service provider wallet addresses, and classification technology through analysis and learning of transaction characteristics by VASP service type are essential.

SUMMARY

The technical problem to be solved through some embodiments of the present disclosure is to provide a method and apparatus for identifying a wallet address of a virtual asset exchange (service provider) traded on the dark web.

Another technical problem to be solved through some embodiments of the present disclosure is to provide a method and apparatus for identifying a virtual asset service provider associated with any virtual asset wallet address, and identifying the type of a wallet associated with the virtual asset service provider.

Another technical problem to be solved through some embodiments of the present disclosure is to provide a method and apparatus for identifying whether any virtual asset wallet address is a cold wallet address of a virtual asset service provider.

Another technical problem to be solved through some embodiments of the present disclosure is to provide a method and apparatus for identifying whether any virtual asset wallet address is a hot wallet address of a virtual asset service provider.

Another technical problem to be solved through some embodiments of the present disclosure is to provide a method and apparatus for identifying whether any virtual asset wallet address is a personal wallet address issued by a virtual asset service provider.

The technical problems of the present disclosure are not limited to the technical problems mentioned above, and other technical problems that are not mentioned will be clearly understood by those skilled in the art from the following description.

According to a method for identifying a wallet address associated with a virtual asset service provider performed on a computing device comprising, receiving a target wallet address, obtaining a transaction of a virtual asset associated with the target wallet address, obtaining a list of a plurality of known wallet addresses of virtual asset service providers (VASPs) and identifying a type of the target wallet address, by performing at least one of a cold wallet determination routine and a hot wallet determination routine for the target wallet address, based on the transaction and the list of known wallet addresses of the VASPs.

According to an embodiment, wherein the cold wallet determination routine, based on a determination that the only sender address associated with the transaction is the target wallet address, a receiver address associated with the transaction includes a hot wallet address of a first VASP, and the transaction satisfies a first condition, determines that the target wallet address is a cold wallet address of the first VASP, wherein the hot wallet address of the first VASP is one of the plurality of known wallet addresses of the VASPs.

According to an embodiment, wherein the target wallet address is a wallet address for a transaction of Bitcoin, wherein the first condition is that a value of a virtual asset associated with the transaction corresponds to 100 BTC.

According to an embodiment, wherein the target wallet address is a wallet address for a transaction of Ethereum, wherein the first condition is that a value of a virtual asset associated with the transaction is 500 ETH or more, and a balance stored in the target wallet address after the transaction exceeds 0 ETH.

According to an embodiment, wherein the hot wallet determination routine, based on a determination that a sender address associated with the transaction includes both the target wallet address and a first hot wallet address of a second VASP, determines that the target wallet address is a second hot wallet address of the second VASP, which is distinguished from the first hot wallet address of the second VASP, wherein the first hot wallet address of the second VASP is one of the plurality of known wallet addresses of the VASPs.

According to an embodiment, wherein identifying a type of the target wallet address by performing at least one of the cold wallet determination routine and the hot wallet determination routine further comprises performing a personal wallet determination routine, wherein the personal wallet determination routine, based on a determination that a sender address associated with the transaction includes the target wallet address, the only receiver address associated with the transaction is a hot wallet address of a third VASP, and a balance stored in the target wallet address after the transaction satisfies a second condition, determines that the target wallet address is one of personal wallet addresses associated with the third VASP, wherein the hot wallet address of the third VASP is one of the plurality of known wallet addresses of the VASPs.

According to an embodiment, wherein the personal wallet determination routine, based on a determination that the balance stored in the target wallet address after the transaction does not satisfy the second condition, determines that the target wallet address is one of other wallet addresses associated with the third VASP.

According to an embodiment, wherein the second condition is that the balance stored in the target wallet address after the transaction is 0.00005000 BTC or less.

According to an embodiment, wherein the hot wallet determination routine, based on a determination that a sender address associated with the transaction is a cold wallet address of a second VASP, determines the target wallet address is a hot wallet address of the second VASP, wherein the cold wallet address of the second VASP is one of the plurality of known wallet addresses of the VASPs.

According to an embodiment, wherein identifying a type of the target wallet address by performing at least one of the cold wallet determination routine and the hot wallet determination routine further comprises performing a personal wallet determination routine, wherein the personal wallet determination routine, based on a determination that a sender address associated with the transaction is the target wallet address, the only receiver address associated with the transaction is a hot wallet address of a third VASP, and a balance stored in the target wallet address after the transaction satisfies a second condition, determines that the target wallet address is one of personal wallet addresses associated with the third VASP, wherein the hot wallet address of the third VASP is one of the plurality of known wallet addresses of the VASPs.

According to an embodiment, wherein the personal wallet determination routine, based on a determination that the balance stored in the target wallet address after the transaction does not satisfy the second condition, determines that the target wallet address is one of other wallet addresses associated with the third VASP.

According to an embodiment, wherein the second condition is that the balance stored in the target wallet address after the transaction is 0 ETH.

According to an embodiment, the plurality of known wallet addresses of the VASPs are collected and stored in advance.

According to another aspect of the present disclosure an apparatus for identifying a wallet address associated with a virtual asset service provider comprising, a VASPs information management unit, a transaction information management unit and a wallet address determination unit, wherein the VASPs information management unit manages information on a known wallet address of a VASPs and types, wherein the transaction information management unit collects and manages transactions related to the virtual asset from an external virtual asset trading network, wherein the wallet address determination unit, if the target wallet address is not stored in the VASPs information management unit, obtains a virtual asset transaction associated with the target wallet address from the transaction information management unit, obtains a list of the known wallet addresses of the VASPs from the VASPs information management unit, and identifies a type of the target wallet address by performing at least one of a plurality of wallet address determination routines for the target wallet address based on the transaction and the list of known wallet addresses of the VASPs.

According to another aspect of the present disclosure a computer readable non-transitory storage medium comprising an instruction, wherein the instruction is executable by a processor to cause the processor to perform steps comprising, receiving a target wallet address, obtaining a transaction of a virtual asset associated with the target wallet address, obtaining a list of a plurality of known wallet addresses of virtual asset service providers (VASPs) and identifying a type of the target wallet address, by performing at least one of a cold wallet determination routine and a hot wallet determination routine for the target wallet address, based on the transaction and the list of known wallet addresses of the VASPs.

BRIEF DESCRIPTION OF THE DRAWINGS

These and/or other aspects will become apparent and more readily appreciated from the following description of the embodiments, taken in conjunction with the accompanying drawings in which:

FIG. 4 is a diagram for describing wallet information referred to in some embodiments disclosed in the present description;

FIG. 5 is a diagram for describing in more detail some steps of the method described with reference to FIG. 2;

DETAILED DESCRIPTION

Figure 1:
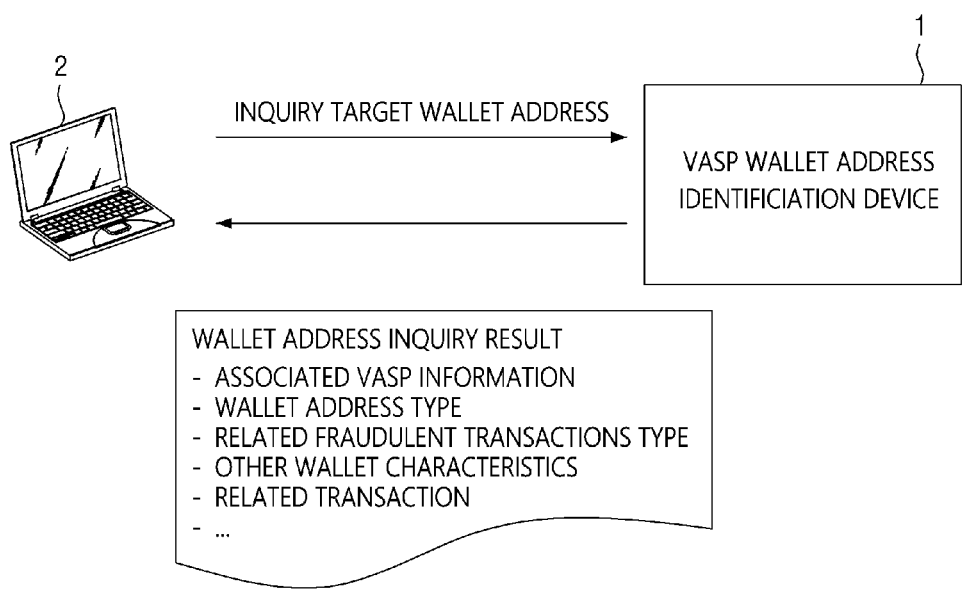
FIG. 1 is a diagram illustrating a device for identifying a wallet address of a virtual asset service provider according to an embodiment disclosed in the present description.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present inventive concept, when it is determined that the detailed description of the related well-known configuration or function may obscure the gist of the present inventive concept, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present inventive concept will be described in detail with reference to the accompanying drawings.

FIG. 1 is a diagram illustrating a device for identifying a wallet address of a virtual asset service provider according to an embodiment disclosed in the present specification.

Referring to FIG. 1, the virtual asset service provider wallet address identification device 1 according to the present embodiment may receive an inquiry target wallet address from the wallet address inquiry device 2, identify the type of the inquiry target wallet address, and provide the wallet address inquiry result.

In this description, a virtual asset service provider (VASP) refers to a company that provides related services, such as an exchange of virtual assets such as Bitcoin and Ethereum, but is not limited to these types of virtual assets, and may refer to a variety of intangible assets provided by a virtual asset service provider.

The inquiry target wallet address is the address of the virtual asset wallet input to the wallet address inquiry device 2, and is a wallet address whose type is not identified. Here, the type refers to which wallet among a hot wallet, a cold wallet, a personal wallet, or other wallet corresponds to the virtual asset wallet.

The wallet address inquiry device 2 is a device that can request identification of a wallet address such as a computer, laptop, smartphone, etc., and means various devices that can receive the inquiry target wallet address and transmit the input address to a virtual asset wallet address identification device 1 (hereinafter, referred as VASP wallet address identification device). Meanwhile, in FIG. 1, the wallet address inquiry device 2 is divided into a device separate from the VASP wallet address identification device 1, but in actual implementation, the wallet address inquiry device 2 and the VASP wallet address identification device 1 may be implemented as a single device. In this case, the VASP wallet address identification device 1 may perform both an operation of inputting an inquiry target wallet address and an operation of outputting a result of inquiring the wallet address.

Hereinafter, a specific operation of the VASP wallet address identification device 1 identifying a type of an inquiry target wallet address and providing a wallet address inquiry result will be described. Specifically, the VASP wallet address identification device 1 may receive an inquiry target wallet address from the wallet address inquiry device 2. Thereafter, the VASP wallet address identification device 1 may obtain a virtual asset transaction associated with the inquiry target wallet address. The virtual asset transaction associated with the inquiry target wallet address may mean information on the transaction of the virtual asset, and may be obtained from an external network. For example, the VASP wallet address identification device 1 may obtain a virtual asset transaction associated with the inquiry target wallet address from an external Bitcoin trading network or an external Ethereum trading network.

The VASP wallet address identification device 1 may obtain a list of a plurality of known virtual asset service provider (VASP) wallet addresses. The list of a plurality of known virtual asset service provider wallet addresses is information collected and stored in advance, and refers to a previously identified type of virtual asset service provider wallet address. The list of a plurality of known virtual asset service provider wallet addresses may refer to information stored in a database.

The VASP wallet address identification device 1 may identify a type of the inquiry target wallet address by performing at least one of a cold wallet determination routine and a hot wallet determination routine for the inquiry target wallet address based on the transaction and the list of known VASP wallet addresses. Here, the cold wallet determination routine refers to an operation of determining whether the inquiry target wallet address is a cold wallet, and the hot wallet determination routine refers to an operation of determining whether the inquiry target wallet address is a hot wallet. Meanwhile, the determination routine may refer to an algorithm for determining which virtual asset type is the type of the corresponding wallet address, and the name may refer to an operation of identifying the type of the inquiry target wallet address, such as a clustering routine and a clustering algorithm. It is not limited to the dictionary meaning of the name.

So far, the VASP wallet address identification device 1 of the present disclosure has been schematically described with reference to FIG. 1. Hereinafter, a method of identifying a wallet address associated with a virtual asset service provider will be described with reference to FIGS. 2 to 9. This embodiment may be performed by a computing device. For example, the computing device may be a VASP wallet address identification device. In describing the present embodiment, description of a subject performing some operations may be omitted. In this case, the performing subject is the computing device.

Figure 2:
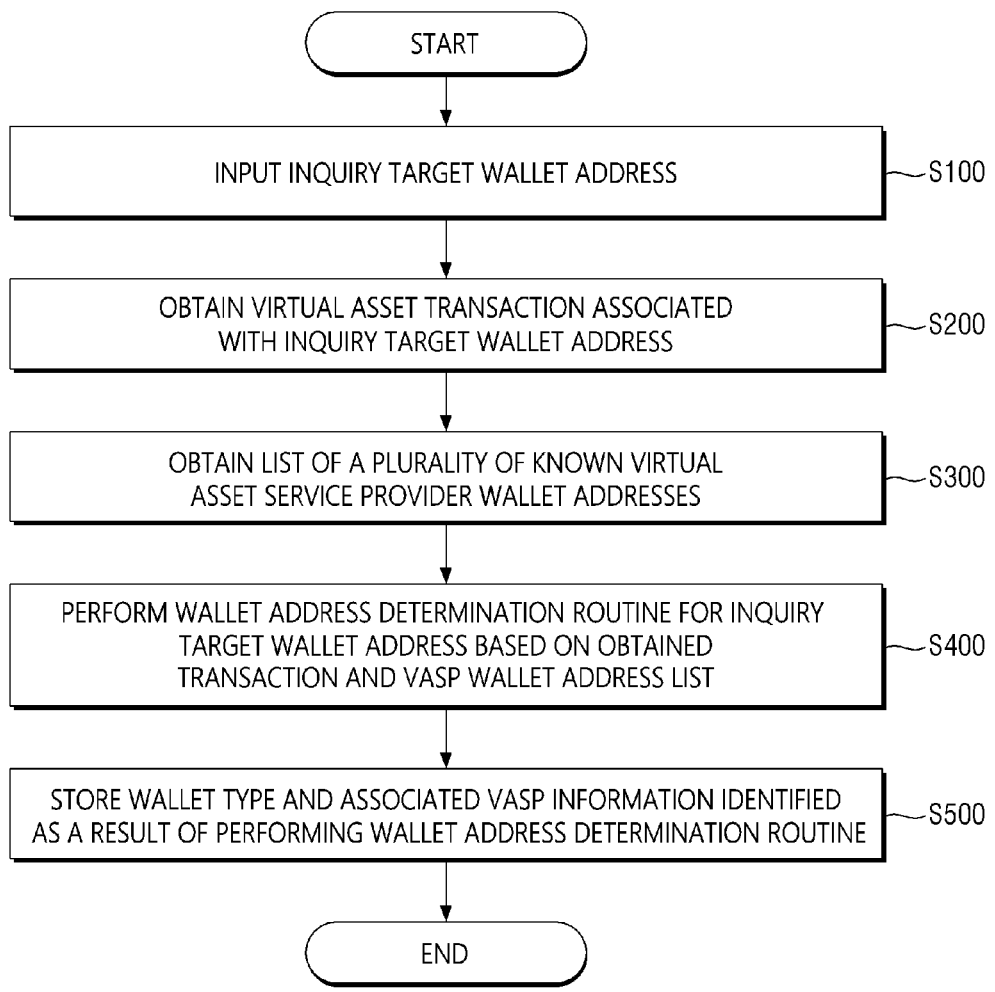
FIG. 2 is a flowchart of a method of identifying a wallet address for a virtual asset service provider according to another embodiment disclosed in the present description.

FIG. 2 is a flowchart of a method of identifying a wallet address of a virtual asset service provider according to another embodiment disclosed in the present description.

First, in step S100 of FIG. 2, an inquiry target wallet address may be input. At this time, the inquiry target wallet address may be an address composed of uppercase and lowercase letters and numbers, such as "1KnnYJx3k6iyzAeTDHKNvL12haFCMUBdPc." In this step, the type of the virtual asset is not input, but only the wallet address seeking inquiry may be input.

Thereafter, in step S200, a virtual asset transaction associated with the inquiry target wallet address may be obtained. The virtual asset transaction may be collected through an external network, and information as shown in FIG. 3 may be obtained by collecting all data of all blocks and transactions from the initial block to the last block of the virtual asset.

Figure 3:
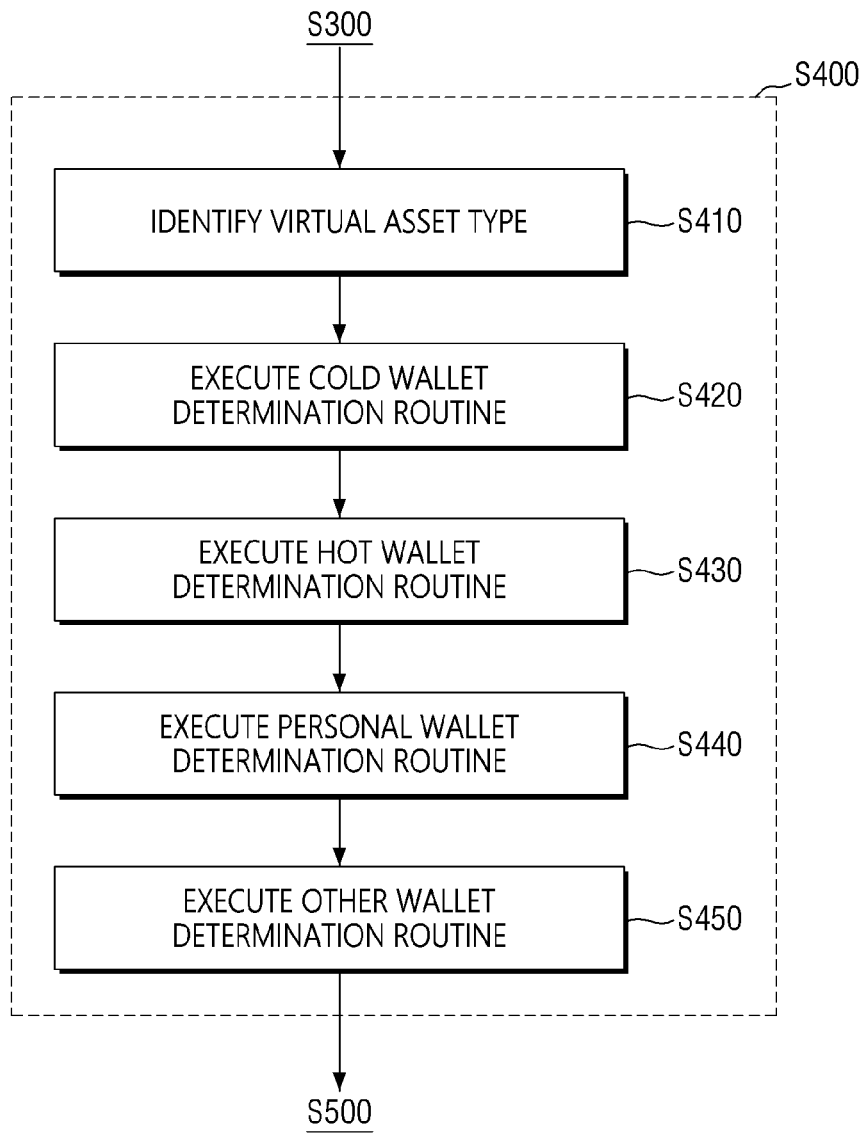
FIG. 3 is a diagram for describing virtual asset transaction information referred to in some embodiments disclosed in the present description.

Referring to Table 11 of FIG. 3, for example, a transaction of Bitcoin may include fields such as input address, output address, transaction asset value and time, and the like. In the transaction of Bitcoin, the input address of ID 1 is "36718cp5ktBy . . . ," the output addresses are "3P7Dbq93T8 . . . " and "13BKpMKWUW . . . ," the transaction asset value is "0.00014093 BTC," and the timestamp value of the transaction time represents "1608012178."

In the transaction of Bitcoin, the input addresses of ID 2 are "399LhavcqSvq . . . " and "13BKpMKWUWQ . . . ," the output address is "ligV5Xev5f . . . ," the transaction asset value is "6.61782071 BTC," and the timestamp value of the transaction time represents "1608012345."

Referring to Table 12 of FIG. 3, the transaction of Ethereum may include fields such as a sender address, a receiver address, a transaction asset value and time, and the like. In the transaction of Ethereum, the sender address of ID 1 is "56fd33b37b28 . . . ," the receiver address is "1c5b662a08d40 . . . ," the transaction asset value is "0.611428114562323488 ETH," and the timestamp value of the transaction time represents "1608012178."

In the transaction of Ethereum, the sender address of ID 2 is "DA8646D996058," the output address is "Eaee3a142ac4e0 . . . ," the transaction asset value is "0.163818897637795252 ETH," and the timestamp value of the transaction time represents "1608012345."

Returning back to FIG. 2, in step S300, a list of a plurality of known virtual asset service provider (VASP) wallet addresses may be obtained. A list of a plurality of known virtual asset service provider wallet addresses may be stored and managed in a database, and in this case, a list of a plurality of known virtual asset service provider wallet addresses may be managed through a RDB (Relational Database). A list of a plurality of known virtual asset service provider wallet addresses may be stored in the form as shown in FIG. 4.

Referring to FIG. 4, a list of a plurality of known virtual asset service provider wallet addresses may include fields such as a wallet address, a virtual asset type, a related VASP, a wallet type, an information source, and a related fraudulent transaction type. Although not shown, information on virtual asset service providers can also be managed through a database. Information on the virtual asset service provider may include, for example, service provider name, service provider code or common name, first business day, business end date, representative name, address, and business type (exchange, P2P, wallet provider). Further, the database may include the initial VASP creation date, the most recent use date, the collection date and time, and the collection place. The database can be stored by classifying the types of fraudulent transactions into "none, investment fraud, malicious code, illegal transactions, money laundering, and hacking of exchanges."

For example, in the list of a plurality of known virtual asset service provider wallet addresses, ID 1 may have the wallet address of "56fd33b37b28 . . . ," the virtual asset type of "ETH," the associated VASP of "VASP #48," and the wallet type of "hot wallet." ID 2 may have the wallet address of "Eaee3a142ac4e0 . . . ," the virtual asset type of "ETH," the associated VASP of "VASP #48," and the wallet type of "cold wallet." ID 3 may have the wallet address of "399LhavcSvqRA8i . . . ," the virtual asset type of "BTC," the associated VASP of "VASP #2," and the wallet type of "personal wallet."

Referring back to FIG. 2, S400 is performed to perform at least one of a cold wallet determination routine and a hot wallet determination routine, so that the type of the inquiry target wallet address may be identified. In this step, a determination routine may be performed for the inquiry target wallet address based on a transaction and a list of known VASP wallet addresses. Thereafter, the wallet type and associated VASP information identified as a result of performing the routine of determining the wallet address may be stored in step S500.

The various embodiments of the determination routine will be described with reference to FIG. 5. FIG. 5 is a view for describing in more detail some steps of the method described with reference to FIG. 2.

When step S400 is performed, at least some of steps S410 to S450 may be performed. In FIG. 5, steps S420 to S450 are shown to be sequentially performed, but this is for illustrative purposes only, and the order of operations of steps S420 to S450 is not limited to the order shown in FIG. 5. For example, steps S420 to S450 may be performed together at the same time, or may be performed in an arbitrary order different from that shown.

Hereinafter, steps S410 to S450 will be described in detail.

First, in step S410, the type of the virtual asset may be identified through the transaction of the inquiry target wallet address. The type of virtual asset at this stage means the type of virtual asset. For example, the type of virtual asset in step S410 means whether the virtual asset is Bitcoin or Ethereum, etc. In this step, it can be identified whether the address of the inquiry target wallet is used for Bitcoin or Ethereum through a transaction. Since different transaction patterns are generated according to the type of asset (such as Bitcoin or Ethereum), different determination routines may be performed according to the type of the virtual asset in steps S420 to 450.

On the other hand, before or after step S410 is performed or at the same time, it is searched to check if information on the virtual asset type (hot wallet, cold wallet, personal wallet, or other wallet) corresponding to the inquiry target wallet address exists in the database, and then if the corresponding information exists in the database, the type of the inquiry target wallet address is identified using the corresponding information, and step S400 may be terminated.

However, if the inquiry target wallet address is not stored in the list of known VASP wallet addresses, the wallet determination routine of steps S420 to S450 may be performed. An example of steps S420 to S450 will be described with reference to FIGS. 5 and 6 together.

Figure 6:
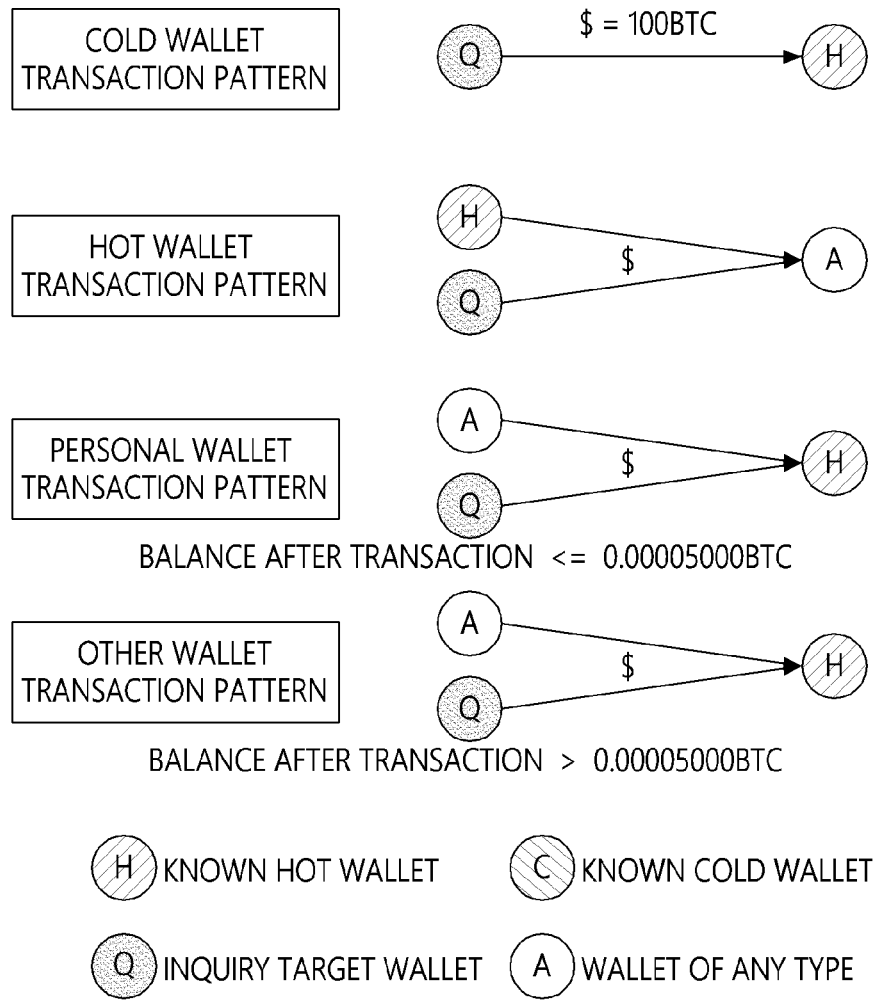
FIGS. 6 and 7 are diagrams for describing transaction patterns for each wallet type, which may be referred to in some embodiments disclosed in the present description.
Figure 7:
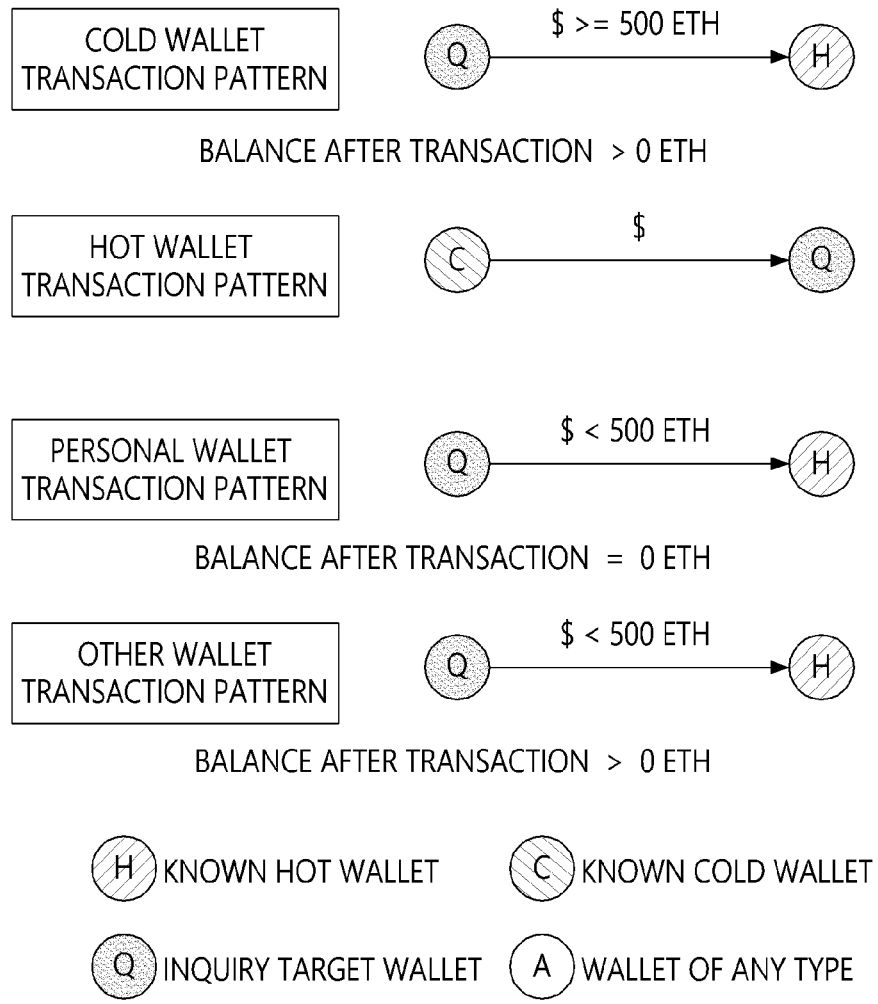

FIGS. 6 and 7 are diagrams for describing transaction patterns for each wallet type, which may be referred to in some embodiments disclosed in the present description. The determination routines of steps S420 to S450 may be understood as routines that determine whether the transaction involving the inquiry target wallet address matches an exemplary cold wallet transaction pattern, a hot wallet transaction pattern, a personal wallet transaction pattern, or other wallet transaction pattern shown in FIGS. 6 and 7. It will be described in detail below.

FIG. 6 shows examples of transaction patterns for various types of wallets of Bitcoin. Hereinafter, the transaction pattern of Bitcoin will be described in the order of a cold wallet transaction pattern, a hot wallet transaction pattern, a personal wallet transaction pattern, and other wallet transaction patterns.

First, the cold wallet determination routine may determine whether a transaction involving an inquiry target wallet address matches a cold wallet transaction pattern. Specifically, when the only sender address of the transaction is the inquiry target wallet address, the receiver address of the transaction is a hot wallet address of a known VASP, and 100 BTC is remitted from the inquiry target wallet address to the hot wallet address of the known VASP by the transaction, it may be determined that it matches the cold wallet transaction pattern. In this case, the inquiry target wallet address may be determined as the cold wallet address of the VASP. At this time, the 100 BTC is an example and may be changed to a larger or smaller asset value.

Next, the hot wallet determination routine may determine whether a transaction involving the inquiry target wallet address matches the hot wallet transaction pattern. Specifically, when an inquiry target wallet address and a known VASP hot wallet address exist in the same input address of a transaction, it may be determined that the inquiry target wallet address matches the hot wallet transaction pattern. In this case, it may be determined that the inquiry target wallet address is the hot wallet address of the VASP.

Next, the personal wallet determination routine may determine whether the transaction involving the inquiry target wallet address matches the personal wallet transaction pattern. Specifically, if there is only one known VASP hot wallet address in the output address of the transaction, there are multiple addresses in the input address of the transaction, and the final balance of the inquiry target wallet after the transaction is 0.00005000 BTC or less, it may be determined that the inquiry target wallet address matches the personal wallet transaction pattern. In this case, the inquiry target wallet address may be determined as the personal wallet address of the VASP. At this time, 0.00005000 BTC is an example and may be changed to a larger or smaller asset value.

Next, the other wallet determination routine may determine whether the transaction involving the inquiry target wallet address matches the other wallet transaction pattern. Specifically, if there is only one known VASP hot wallet address in the output address of the transaction, there are multiple addresses in the input address of the transaction, and the final balance of the inquiry target wallet after the transaction exceeds 0.00005000 BTC, it may be determined that the inquiry target wallet address matched the personal wallet transaction pattern. In this case, the inquiry target wallet address may be determined as the other wallet address of the VASP. At this time, 0.00005000 BTC is an example and may be changed to a larger or smaller asset value.

So far, examples of various transaction patterns for various wallets of Bitcoin have been described with reference to FIG. 6.

Next, FIG. 7 shows examples of various transaction patterns for various wallets of Ethereum. Hereinafter, the transaction pattern of Ethereum will be described in the order of a cold wallet transaction pattern, a hot wallet transaction pattern, a personal wallet transaction pattern, and other wallet transaction patterns.

First, the cold wallet determination routine may determine whether a transaction involving an inquiry target wallet address matches a cold wallet transaction pattern. Specifically, if there is the inquiry target wallet address in the sender address of the transaction, there is the known VASP hot wallet address in the receiver address, and the remitted virtual asset is 500 ETH or more, it may be determined to match the cold wallet transaction pattern. In this case, the inquiry target wallet address may be determined as the cold wallet address of the VASP. In this case, the 500 ETH is an example and may be changed to a lager or smaller asset value.

Next, the hot wallet determination routine may determine whether a transaction involving the inquiry target wallet address matches the hot wallet transaction pattern. Specifically, if there is a known VASP hot wallet address in the sender address of the transaction, and there is the inquiry target wallet in the receiver address, it may be determined that the inquiry target wallet address matches the hot wallet transaction pattern. In this case, the inquiry target wallet address may be determined as the cold wallet address of the VASP.

Next, the personal wallet determination routine may determine whether the transaction involving the inquiry target wallet address matches the personal wallet transaction pattern. Specifically, if there is the inquiry target wallet address in the sender address of the transaction, there is the known VASP hot wallet address in the receiver address, the transactional virtual asset value occurred in the transaction is less than 500 ETH, and the final balance of the inquiry target wallet after the transaction is 0 ETH, it may be determined that the inquiry target wallet address matches the personal wallet transaction pattern. In this case, the inquiry target wallet address may be determined as the personal wallet address of the VASP. At this time, 0 ETH is an example and may be changed to a larger or smaller asset value.

Next, the other wallet determination routine may determine whether the transaction involving the inquiry target wallet address matches the other wallet transaction pattern.

Specifically, if there is the inquiry target wallet address in the sender address of the transaction, there is the known VASP hot wallet address in the receiver address, the transactional virtual asset value occurred in the transaction is less than 500 ETH, and the final valance of the inquiry target wallet after the transaction is 0 ETH or more, it may be determined that the inquiry target wallet address matches the other wallet transaction pattern. In this case, the inquiry target wallet address may be determined as the other wallet address of the VASP. At this time, 0 ETH is an example and may be changed to a larger or smaller asset value.

So far, a method of identifying a wallet address associated with a virtual asset service provider disclosed in the present description has been described with reference to FIGS. 1 to 7. In the method of identifying a wallet address associated with a virtual asset service provider according to some embodiments of the present disclosure, there is an advantage of being able to identify more accurately the type of wallet such as a cold wallet, a hot wallet, a personal wallet, and other wallets in addition to the information on which virtual asset service provider the inquiry target wallet address is associated with.

Hereinafter, a specific configuration and operation of the virtual asset service provider wallet address identification device 1 will be described with reference to FIGS. 8 to 10. In this case, the description described above with reference to FIGS. 2 to 7 may be referred to.

Figure 8:
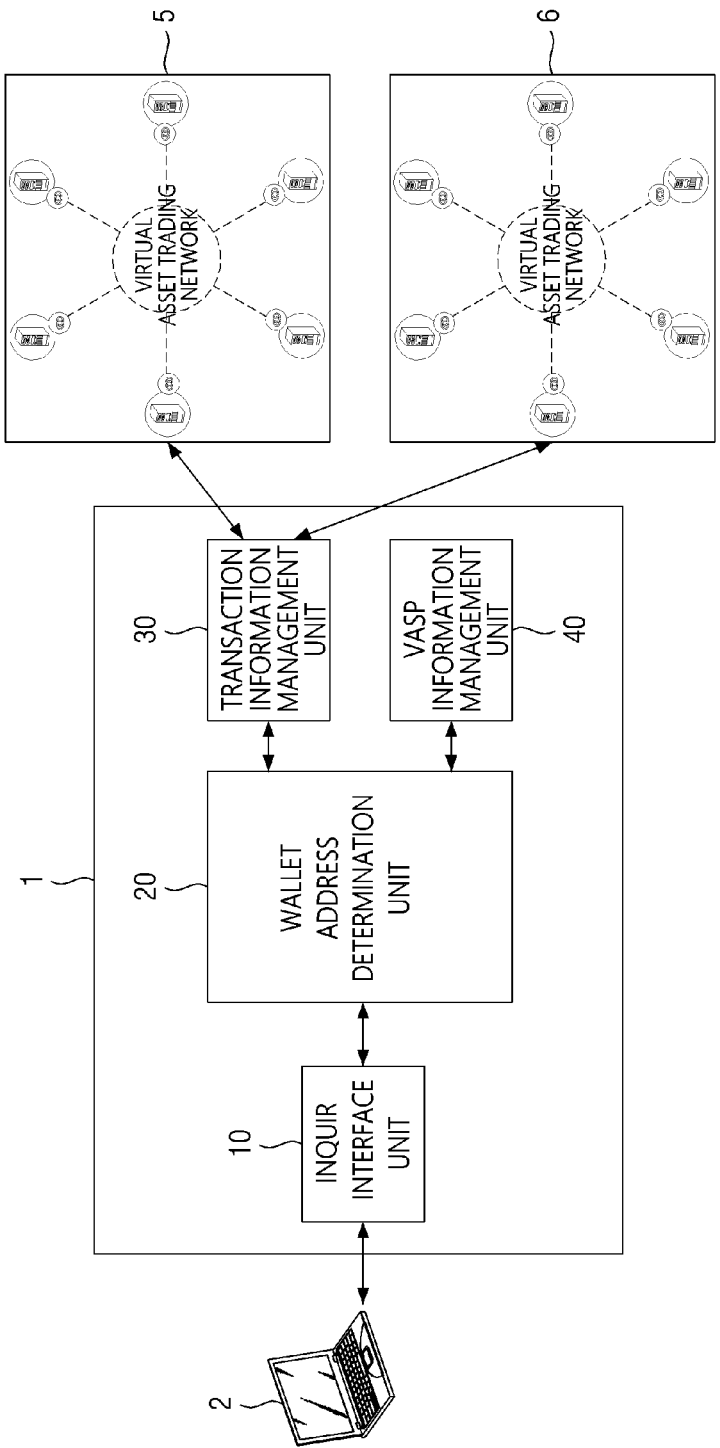
FIG. 8 is a block diagram of a device for identifying a wallet address of a virtual asset service provider described with reference to FIG. 1.

FIG. 8 is a block diagram of the virtual asset service provider wallet address identification device 1 described with reference to FIG. 1.

Referring to FIG. 8, the virtual asset service provider wallet address identification device 1 may include an inquiry interface unit 10, a wallet address determination unit 20, a transaction information management unit 30, and a VASP information management unit 40.

The inquiry interface unit 10 may receive the address of the inquiry target wallet obtained from the wallet address inquiry device 2. The wallet address determination unit 20 may identify the type of the inquiry target wallet address based on information stored in the transaction information management unit 30 and the VASP information management unit 40.

The transaction information management unit 30 may collect transactions from a virtual asset trading network implemented as an external network. The transaction information management unit 30 may collect transactions for Bitcoin from the Bitcoin trading network 5 and may collect transactions for Ethereum from the Ethereum trading network 6. The transaction information management unit 30 may collect transactions from various external networks capable of collecting transactions in addition to the above-described external networks.

If the inquiry target wallet address is stored in the VASP information management unit 40, the wallet address determination unit 20 may use the information to identify the type of the inquiry target wallet address.

If the inquiry target wallet address is not stored in the VASP information management unit 40, the wallet address determination unit 20 may obtain a virtual asset transaction associated with the inquiry target wallet address from the transaction information management unit 30, and obtain the list of known VASP wallet addresses from the VASP information management unit 40.

In this case, the wallet address determination unit 20 performs at least one of a plurality of wallet address determination routines for the inquiry target wallet address based on the transaction and the list of known VASP wallet addresses to identify the type of the inquiry target wallet address.

Figure 9:
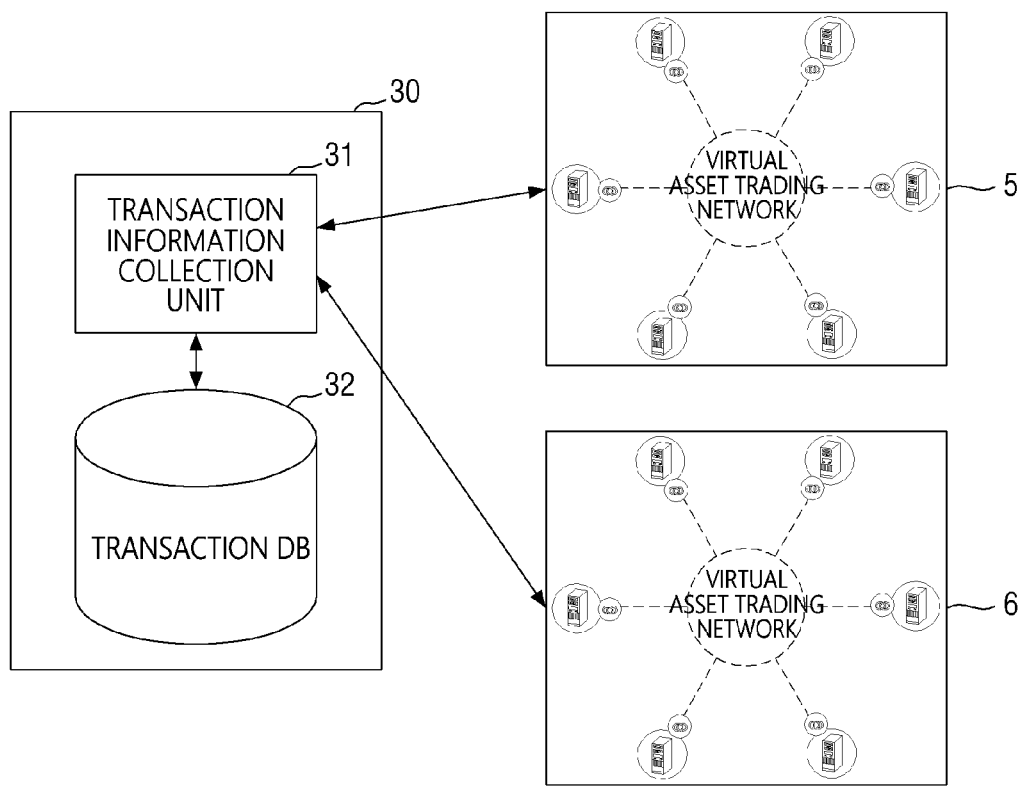
FIG. 9 is a diagram for describing the function and configuration of the transaction information management unit described with reference to FIG. 8.

FIG. 9 is a diagram for describing the function and configuration of the transaction information management unit 30 described with reference to FIG. 8.

The transaction information management unit 30 may collect transactions from a virtual asset trading network implemented as an external network by using the transaction information collection unit. The transaction information collection unit may store transactions from the Bitcoin trading network 5 and the Ethereum trading network 6, respectively, and store them in the transaction DB.

Figure 10:
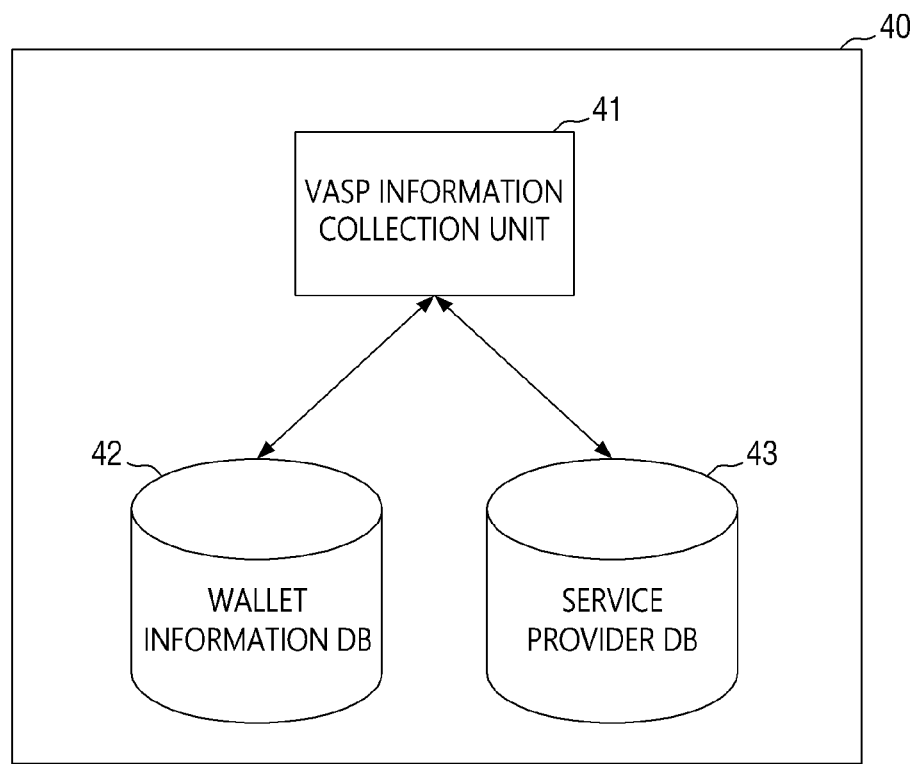
FIG. 10 is a view for describing the function and configuration of the VASP information management unit described with reference to FIG. 8.

FIG. 10 is a diagram for describing the function and configuration of the VASP information management unit 40 described with reference to FIG. 8.

The VASP information management unit 40 may store, manage, or update information in the wallet information DB 42 and the service provider information DB 43 using the VASP information collection unit 41. The VASP information management unit 40 may manage information on a known VASP wallet address and type by using the VASP information collection unit 41. The VASP information collection unit 41 may load information from the wallet information DB 42 and provide information on a known VASP wallet address and type to the wallet address determination unit 20. The VASP information collection unit 41 may add information on the new VASP wallet address and type to the wallet information DB 42 and the service provider information DB 43, or newly update information previously existing in the wallet information DB 42 and the service provider information DB 43 based on the result determined by the wallet address determination unit 20.

The wallet address determination unit 20 may identify the type of the inquiry target wallet address by using the above-described transaction information and information on the known VASP wallet address and type.

Hereinafter, a routine, in which the wallet address determination unit 20 identifies the type of the inquiry target wallet address in the Bitcoin transaction pattern in the order of a cold wallet transaction pattern, a hot wallet transaction pattern, a personal wallet transaction pattern, and other wallet transaction patterns, will be described.

First, the cold wallet determination routine corresponds to a case where the only sender address of the transaction is the inquiry target wallet address, and the receiver address of the transaction is the hot wallet address of the first VASP.

The wallet address determination unit 20 may determine that the inquiry target wallet address is the cold wallet address of the first VASP based on the determination that the transaction satisfies the first condition in this routine. In this case, the hot wallet address of the first VASP may be determined as one of a plurality of known VASP wallet addresses.

In this embodiment, the inquiry target wallet address may be a wallet address for transactions of Bitcoin. The first condition may be a condition, in which the value of the virtual asset traded by the transaction corresponds to 100 BTC.

That is, if the inquiry target wallet address is input and there is a transaction indicating that 100 BTC has been remitted from the inquiry target wallet to the hot wallet of the first VASP, the wallet address determination unit 20 may determine that the inquiry target wallet is the cold wallet of the first VASP.

Based on the determination that the sender address of the transaction includes both the inquiry target wallet address and the first hot wallet address of the second VASP, the hot wallet determination routine determines that the inquiry target wallet address is the second hot wallet address of the second VASP, which is distinguished from the first hot wallet address of the second VASP. In this case, the first hot wallet address of the second VASP is one of a plurality of known VASP wallet addresses.

That is, if the inquiry target wallet address is input and there is a transaction indicating that remittance from the inquiry target wallet and the first hot wallet known as the second VASP to a wallet of any type exists, the wallet address determination unit 20 may determine that the inquiry target wallet is the second hot wallet address of the second VASP.

In the personal wallet determination routine, the sender address of the transaction may include the inquiry target wallet address, and the only receiver address of the transaction may be the hot wallet address of the third VASP. At this time, based on the determination that the balance stored in the inquiry target wallet address after the transaction satisfies the second condition, the wallet address determination unit 20 may determine that the inquiry target wallet address is one of the personal wallet addresses associated with the third VASP. Here, the second condition may be a condition, in which the balance stored in the inquiry target wallet address after the transaction is 0.00005000 BTC or less. The hot wallet address of the third VASP may be one of a plurality of known VASP wallet addresses.

That is, if the inquiry target wallet is input, a transaction indicating that the virtual asset has been remitted from the wallet of any type together with the inquiry target wallet to the hot wallet of the third VASP occurs, and then the balance in the inquiry target wallet is 0.00005000 BTC or less, the wallet address determination unit 20 may determine that the inquiry target wallet is a personal wallet associated with the third VASP.

The other wallet determination routine may determine that the inquiry target wallet address is one of the other wallet addresses associated with the third VASP based on the determination that the balance stored in the inquiry target wallet address after the transaction does not satisfy the second condition in the personal wallet determination routine. That is, when the balance stored in the inquiry target wallet address is greater than 0.00005000 BTC, the wallet address determination unit 20 may determine that the inquiry target wallet address is one of other wallet addresses associated with the third VASP.

That is, if the inquiry target wallet is input, a transaction indicating that the virtual asset has been remitted from the wallet of any type together with the inquiry target wallet to the hot wallet of the third VASP occurs, and then the balance in the inquiry target wallets is greater than 0.00005000 BTC, the wallet address determination unit 20 may determine that the inquiry target wallet is other wallet associated with the third VASP.

So far, the examples of various transaction patterns for various wallets of Bitcoin have been described.

Hereinafter, the transaction pattern of Ethereum will be described in the order of a cold wallet transaction pattern, a hot wallet transaction pattern, a personal wallet transaction pattern, and other wallet transaction patterns.

First, the cold wallet determination routine corresponds to a case where the only sender address of the transaction is the inquiry target wallet address, and the receiver address of the transaction is the hot wallet address of the first VASP.

The wallet address determination unit 20 may determine that the inquiry target wallet address is the cold wallet address of the first VASP based on the determination that the transaction satisfies the first condition in this routine. In this case, the hot wallet address of the first VASP may be one of a plurality of known VASP wallet addresses.

In this embodiment, the inquiry target wallet address may be a wallet address for transactions of Ethereum. The first condition may be a condition, in which the value of the virtual asset traded by the transaction is 500 ETH or more, and the balance stored in the inquiry target wallet address after the transaction exceeds 0 ETH.

That is, if the inquiry target wallet address is input, a transaction indicating that the value of the virtual asset traded from the inquiry target wallet to a wallet known as the hot wallet of the first VASP is 500 ETH or more occurs, and the balance stored in the inquiry target wallet address after the transaction exceeds 0 ETH, the wallet address determination unit 20 may determine that the inquiry target wallet is a cold wallet of the first VASP.

The hot wallet determination routine may determine that the inquiry target wallet address is the hot wallet address of the second VASP based on a determination that the sender address of the transaction is the cold wallet address of the second VASP. In this case, the cold wallet address of the second VASP may be one of the plurality of known VASP wallet addresses.

That is, if an inquiry target wallet address is input and a transaction indicating that the inquiry target wallet receives a virtual asset from the cold wallet of the known second VASP occurs, the wallet address determination unit 20 may determine that the inquiry target wallet address is the hot address of the second VASP.

In the personal wallet determination routine, the sender address of the transaction is the inquiry target wallet address, the only receiver address of the transaction is the hot wallet address of the third VASP, and the wallet address determination unit 20 may determine that the inquiry target wallet address is one of the personal wallet addresses associated with the third VASP based on the determination that the balance stored in the inquiry target wallet address after the transaction satisfies the second condition. At this time, this should be the case where the trading of the virtual asset in the occurred transaction is less than 500 ETH. Here, the second condition may be a condition, in which the balance stored in the inquiry target wallet address after the transaction is 0 ETH. The hot wallet address of the third VASP may be one of the plurality of known VASP wallet addresses.

That is, if an inquiry target wallet is input, a transaction indicating that a virtual asset of less than 500 ETH has been remitted from the inquiry target wallet to the hot wallet of the third VASP occurs, and then the balance stored in the wallet address of the inquiry target wallet address is 0 ETH, the wallet address determination unit 20 may determine that the inquiry target wallet is a personal wallet associated with the third VASP.

In FIG. 7, the other wallet determination routine may determine that the inquiry target wallet address is one of the other wallet addresses associated with the third VASP based on the determination that the balance stored in the inquiry target wallet address after the transaction does not satisfy the second condition. At this time, this should be the case where the trading of the virtual asset in the occurred transaction is less than 500 ETH. That is, if the balance stored in the inquiry target wallet address after the transaction is greater than 0 ETH, the wallet address determination unit 20 may determine that the inquiry target wallet address is one of other wallet addresses associated with the third VASP.

That is, if the inquiry target wallet is input, a transaction indicating that a virtual asset of less than 500 ETH has been remitted from the inquiry target wallet to the hot wallet of the third VASP occurs, and the balance stored in the wallet address of the inquiry target wallet is greater than 0 ETH, the inquiry target wallet may be determined as a personal wallet associated with the third VASP.

Figure 11:
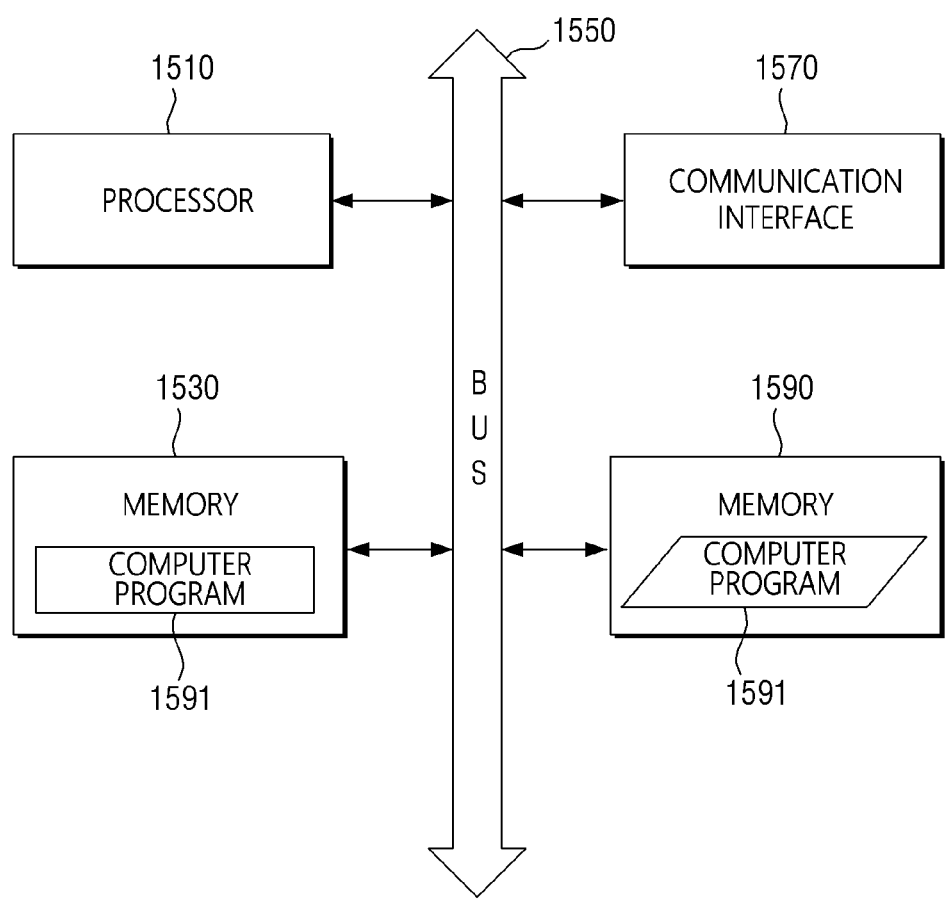
FIG. 11 is a diagram for describing an exemplary computing device capable of implementing a virtual asset service provider wallet address identification device according to some embodiments disclosed in the present description.

The specific configuration and function of the virtual asset service provider wallet address identification device 1 has been described with reference to FIGS. 8 to 10. FIG. 11 is an exemplary hardware configuration diagram illustrating the computing device 500. The computing device 500 of FIG. 11 may be the VASP wallet address identification device 1 of FIGS. 8 to 10.

As shown in FIG. 11, the computing device 500 may include one or more processors 510, a bus 550, a communication interface 570, a memory 530, which loads a computer program 591 executed by the processors 510, and a storage 590 for storing the computer program 591. However, FIG. 11 illustrates the components related to the embodiment of the present disclosure. Therefore, it will be appreciated by those skilled in the art that the present disclosure may further include other general purpose components in addition to the components shown in FIG. 11.

The processor 510 may control overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 may store various data, instructions and/or information. The memory 530 may load one or more programs 591 from the storage 590 to execute methods/operations according to various embodiments of the present disclosure. For example, based on the computer program 591 being loaded into the memory 530, the logic as shown in FIG. 2 may be implemented on the memory 530. An example of the memory 530 may be a RAM, but is not limited thereto.

The bus 550 may provide communication between components of the computing device 500. The bus 550 may be implemented as various types of bus such as an address bus, a data bus and a control bus.

The communication interface 570 may support wired and wireless internet communication of the computing device 500. The communication interface 570 may support various communication methods other than internet communication. To this end, the communication interface 570 may be configured to include a communication module based on hardware and/or software well known in the art of the present disclosure.

The storage 590 can non-temporarily store one or more computer programs 591. The storage 590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure may be implemented. Based on the computer program 591 being loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to another computing device via a network such as internet and installed in the other computing device, being used in the other computing device.

Although the operations may be shown in an order in the drawings, those skilled in the art will appreciate that many variations and modifications can be made to the embodiments without substantially departing from the principles of the present disclosure. The disclosed embodiments of the present disclosure may be used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for identifying a wallet address associated with a virtual asset service provider performed on a wallet address identification device having a hardware processor, the method comprising:
   receiving, by an inquiry interface unit, from a wallet address inquiry device having a hardware processor, a target wallet address;
   obtaining, by a transaction information management unit, from an external network, a transaction of a virtual asset corresponding to the target wallet address;
   obtaining, by a wallet address identification device, a list of a plurality of known wallet addresses of virtual asset service providers (VASPs), from a non-transitory memory database of the wallet address identification device, which collects and stores information regarding the plurality of known wallet addresses of VASPs;
   identifying, by the wallet address identification device, a type of the target wallet address, by performing at least one of a cold wallet determination routine and a hot wallet determination routine for the target wallet address, based on the transaction and the list of known wallet addresses of the VASPs;
   transmitting, by the wallet address identification device, to the wallet address inquiry device, the type of the target wallet address and the associated VASP information;
   determining, by the wallet address identification device, that a wallet information database or a service provider information database does not have information on the target wallet address; and
   based on a determination, by the wallet address identification device, that the wallet information database or the service provider information database does not have the information on the target wallet address, adding the information on the target wallet address and the type of the target wallet address to the wallet information database or the service provider information database.

2. The method of claim 1, wherein the cold wallet determination routine, based on a determination that the only sender address associated with the transaction is the target wallet address, a receiver address associated with the transaction includes a hot wallet address of a first VASP, and the transaction satisfies a first condition, determines that the target wallet address is a cold wallet address of the first VASP,
- wherein the hot wallet address of the first VASP is one of the plurality of known wallet addresses of the VASPs, and
- wherein the first condition is that a value of a virtual asset associated with the transaction corresponds to 100 units of a digital currency.

3. The method of claim 1, wherein the cold wallet determination routine, based on a determination that the only sender address associated with the transaction is the target wallet address, a receiver address associated with the transaction includes a hot wallet address of a first VASP, and the transaction satisfies a first condition, determines that the target wallet address is a cold wallet address of the first VASP,
- wherein the hot wallet address of the first VASP is one of the plurality of known wallet addresses of the VASPs, and
- wherein the first condition is that a value of a virtual asset associated with the transaction is 500 ETH or more, and a balance stored in the target wallet address after the transaction exceeds 0 ETH.

4. The method of claim 1, wherein the hot wallet determination routine, based on a determination that a sender address associated with the transaction includes both the target wallet address and a first hot wallet address of a second VASP, determines that the target wallet address is a second hot wallet address of the second VASP, which is distinguished from the first hot wallet address of the second VASP,
- wherein the first hot wallet address of the second VASP is one of the plurality of known wallet addresses of the VASPs.

5. The method of claim 4, wherein identifying a type of the target wallet address by performing at least one of the cold wallet determination routine and the hot wallet determination routine further comprises performing a personal wallet determination routine,
- wherein the personal wallet determination routine, based on a determination that a sender address associated with the transaction includes the target wallet address, the only receiver address associated with the transaction is a hot wallet address of a third VASP, and a balance stored in the target wallet address after the transaction satisfies a second condition, determines that the target wallet address is one of personal wallet addresses associated with the third VASP,
- wherein the hot wallet address of the third VASP is one of the plurality of known wallet addresses of the VASPs,
- wherein the personal wallet determination routine, based on a determination that the balance stored in the target wallet address after the transaction does not satisfy the second condition, determines that the target wallet address is one of other wallet addresses associated with the third VASP, and
- wherein the second condition is that the balance stored in the target wallet address after the transaction is 0.00005000 BTC or less.

6. The method of claim 1, wherein the hot wallet determination routine, based on a determination that a sender address associated with the transaction is a cold wallet address of a second VASP, determines the target wallet address is a hot wallet address of the second VASP,
- wherein the cold wallet address of the second VASP is one of the plurality of known wallet addresses of the VASPs.

7. The method of claim 6, wherein identifying a type of the target wallet address by performing at least one of the cold wallet determination routine and the hot wallet determination routine further comprises performing a personal wallet determination routine,
- wherein the personal wallet determination routine, based on a determination that a sender address associated with the transaction is the target wallet address, the only receiver address associated with the transaction is a hot wallet address of a third VASP, and a balance stored in the target wallet address after the transaction satisfies a second condition, determines that the target wallet address is one of personal wallet addresses associated with the third VASP,
- wherein the hot wallet address of the third VASP is one of the plurality of known wallet addresses of the VASPs,
- wherein the personal wallet determination routine, based on a determination that the balance stored in the target wallet address after the transaction does not satisfy the second condition, determines that the target wallet address is one of other wallet addresses associated with the third VASP, and
- wherein the second condition is that the balance stored in the target wallet address after the transaction is 0 ETH.

8. A computer readable non-transitory storage medium comprising an instruction,
- wherein the instruction is executable by a hardware processor of a wallet address identification device, to cause the hardware processor of the wallet address identification device to perform steps comprising:
- receiving, by an inquiry interface unit, from a wallet address inquiry device having a hardware processor, a target wallet address;
- obtaining, by a transaction information management unit, from an external network, a transaction of a virtual asset associated with the target wallet address;
- obtaining, by a wallet address identification device, a list of a plurality of known wallet addresses of virtual asset service providers (VASPs), from a non-transitory memory database of the wallet address identification device, which collects and stores information regarding the plurality of known wallet addresses of VASPs;
- identifying, by the wallet address identification device, a type of the target wallet address, by performing at least one of a cold wallet determination routine and a hot wallet determination routine for the target wallet address, based on the transaction and the list of known wallet addresses of the VASPs;
- transmitting, by the wallet address identification device, to the wallet address inquiry device, the type of the target wallet address and the associated VASP information;
- determining, by the wallet address identification device, that a wallet information database or a service provider information database does not have information on the target wallet address; and
- based on a determination, by the wallet address identification device, that the wallet information database or the service provider information database does not have the information on the target wallet address, adding the information on the target wallet address and the type of the target wallet address to the wallet information database or the service provider information database.

\* \* \* \* \*